United States Patent Office 3,783,125
Patented Jan. 1, 1974

3,783,125
SWEETENING LIQUID HYDROCARBONS WITH A CALCINED HEAVY METAL EXCHANGED ZEOLITE
John A. Ondrey, Tyler, Tex., and Michael R. Basila, Munster, Ind., assignors to Howe-Baker Engineers, Inc., Tyler, Tex.
No Drawing. Filed Sept. 21, 1972, Ser. No. 291,152
Int. Cl. C10g 27/00
U.S. Cl. 208—191                    6 Claims

ABSTRACT OF THE DISCLOSURE

A liquid hydrocarbon containing organic mercaptans is contacted with a heavy metal exchanged aluminosilicate zeolite containing from 5 to 20% by weight of copper, chromium, tin or mixtures thereof to convert the mercaptans to disulfides. The metal exchanged zeolite is prepared from a dilute solution of the metal salt, rinsed, dried at 80–150° C. for 2–6 hours, heated to 500° C. for 4–8 hours, calcined at 500–700° C. for 6–12 hours and then cooled over a period of 3–6 hours.

INTRODUCTION

This invention relates to a process for sweetening hydrocarbon compositions using an improved heavy metal exchanged aluminosilicate zeolite. It is well known that hydrocarbon compositions derived from the refining, cracking, reforming and/or distillation of petroleum oils contain appreciable quantities of mercaptans. These mercaptans are objectionable primarily because of this odor. They are also catalyst-poisoning compounds for several types of catalysts used in the refining, reforming and/or cracking of hydrocarbon compositions.

The prior art has disclosed various methods for sweetening hydrocarbon compositions which contain mercaptans. The use of metal exchanged zeolites is disclosed in U.S. 3,378,484; 3,392,111; and 3,454,438. These references disclose the use of metal exchanged zeolites to convert organic mercaptans of the formula RSH to disulfides having the general formula RSSR.

More specifically, U.S. 3,378,484 teaches the use of an exchanged aluminosilicate zeolite for the sweetening of hydrocarbon compositions. However, the metal exchanged aluminosilicate zeolites taught in U.S. 3,378,484 have the tendency to lose the metal when used in systems to convert organic mercaptans to disulfides in heavier hydrocarbon feedstocks. It would be desirable to have an exchanged aluminosilicate zeolite which could be used in heavier hydrocarbon feedstock systems without loss of the metal from the zeolite.

It has been found that by calcining a metal exchanged aluminosilicate zeolite under certain critical conditions, the resultant zeolite does not lose the metal when used in heavier hydrocarbon feedstock systems.

OBJECTS

It is therefore an object of this invention to provide an improved heavy metal exchanged aluminosilicate zeolite useful for sweetening hydrocarbon compositions.

A further object of this invention is to provide an improved heavy metal exchanged aluminosilicate zeolite which can be used in heavier hydrocarbon feedstock systems without loss of the metal from the zeolite.

Another object of this invention is to provide an improved copper exchanged aluminosilicate zeolite which can be used in heavier hydrocarbon feedstock systems.

A still further object of this invention is to provide an improved copper exchanged aluminosilicate zeolite which has been calcined at from 500 to 700° C. for 6 to 12 hours.

Other objects will appear hereinafter.

THE INVENTION

This invention involves a method for sweetening sour hydrocarbon compositions which comprises contacting a liquid hydrocarbon containing organic mercaptans of the formula RSH with an improved heavy metal exchanged aluminosilicate zeolite. This improved heavy metal exchanged aluminosilicate zeolite is prepared by the steps:

(A) Forming a heavy metal exchanged zeolite by contacting an aluminosilicate zeolite with a dilute solution of a heavy metal salt, such that the aluminosilicate zeolite contains from 5 to 20% by weight of heavy metal;
(B) Rinsing the exchanged zeolite with water;
(C) Drying the exchanged zeolite at from 80 to 150° C. for from 2 to 6 hours;
(D) Heating the exchanged zeolite at 500° C. over a period of 4 to 8 hours;
(E) Calcining the exchanged zeolite at 500 to 700° C. for from 6 to 12 hours; and
(F) Cooling the exchanged zeolite to ambient temperature over a period of 3 to 6 hours.

In the subject process organic mercaptans of the formula RSH are converter to metal (Me)SR and in part to disulfides of the formula RSSR wherein R in the aforesaid formulae represents the residue attached to the mercapto group of the organic mercaptans. This residue may be an alkyl or alkenyl group of about 1 to 20 carbons, a cycloalkyl group, a cycloalkenyl group, an aromatic hydrocarbon group, a hydroxy aromatic group; or the like. The particular nature of the group R— is not of critical importance and it is to be understood that the group R represents the residue of diverse types of mercaptans occurring in petroleum oils and/or fractionated or modified fractions thereof.

The heavy metal exchanged aluminosilicate zeolite is prepared by contacting an aluminosilicate zeolite wtih a dilute solution of a heavy metal salt such that the aluminosilicate zeolite contains from 5 to 20% by weight of heavy metal, preferably 8 to 12% by weight. The most preferred heavy metal content is 10 to 12% by weight. The heavy metal salt is dissolved in water and generally has a concentration of 1 to 25% by weight, preferably 5 to 10% by weight.

The aluminosilicate zeolites useful in this invention may be either naturally occurring or synthetic zeolites.

The natural zeolites are minerals having a continuous framework of linked tetrahedral groupings around silicon and aluminum atoms. The negative charge of this framework is balanced by positive ions in the cavities of the zeolites. Some natural zeolites have well defined crystalline structures. Among the well-known natural zeolites are mordenite, faujasite, chabazite, gmelinite, analcite, erionite, natrolite, stilbite, heulandite, and thompsonite. Glauconite is a ferrous aluminosilicate having ion exchange capacity.

Synthetic zeolites are aluminosilicates of either the fusion or gel type. The fusion types are similar to natural zeolites and are prepared by fusing together mixtures of soda, potash, felspar and kaolin. Gel type synthetic zeolites can be prepared, for example, by adding alkali in controlled proportions to acid solutions of aluminum sulfate and sodium silicate, or by the reaction of sodium silicate with a variety of aluminum salts such as sodium aluminate. Amorphous synthetic zeolites that are produced in this manner are among the preferred ion exchange compositions for use in the present invention. These zeolites have a high base exchange capacity and an essentially macroporous structure. The preferred amorphous zeolites have a pore diameter range of from 50 to 2,000 A. and most often from 100 to 1,100 A. The synthetic amorphous zeolites have average pore diameters of about 100 A. These materials have a great number of pores in the 50 to 150 A. range.

The zeolites that can be used in the present invention expressed in terms of moles can be represented as follows:

$$0.9 \pm 0.2 M_{2/n}O : Al_2O_3 : xSiO_2$$

wherein M is selected from the group consisting of hydrogen, monovalent and divalent metal cations and mixtures thereof; $n$ is the valence of M; $x$ is a number from about 1.5 to about 12, said value being dependent upon the particular type of zeolite.

The cation represented by M in the above formula will usually be a monovalent alkali metal cation, e.g., sodium, lithium or potassium before the zeolite is treated with a metal salt to produce the hydrocarbon treating material of the present invention.

The heavy metal salts useful in this invention are water-soluble and are capable of forming ions in solution. The salts have a heavy metal selected from the group consisting of copper, chromium, tin and mixtures thereof.

Generally, the anionic portion of the heavy metal salt is not important and should not be limited to any one type. Typically, useful anions which are used in this invention are sulfates, nitrates, acetates and chlorides.

The preferred heavy metal salts of this invention are copper sulfate, chromium sulfate and mixtures thereof.

After the dilute heavy metal salt solution is contacted with the aluminosilicate zeolite, the exchanged zeolite is then rinsed with water to remove any excessive salt solution which might be present and then is drained. The exchanged zeolite is then dried at for 2 to 6 hours at 80 to 150° C., preferably 110° C.

The improvement of this invention involves the calcination of the metal exchanged zeolite. It has been determined that the metal exchanged zeolite must be heated slowly to 500° C. This heating step must extend over a period of 4 to 8 hours, the preferred time being 6 hours. The slow rate of heating the metal exchanged zeolite is necessary in order to prevent rapid vaporization of water which might be entrained within the zeolite. If this were to occur, the zeolite particles could explode or sinter due to the high pressure of the steam, resulting in the formation of the undesired fines. Once the metal exchanged zeolite has been heated to 500° C., the calcination is performed by heating from 500 to 700° C. for 6 to 12 hours. Preferably the calcination is performed at 500° C. for 12 hours. After the calcination step, the metal exchanged zeolite is cooled to ambient temperature over a period of 3 to 6 hours.

The hydrocarbons with which the invention is concerned are liquid hydrocarbons capable of flowing through a bed of resin at the treatment temperature. These liquid hydrocarbons may be liquid alkanes, liquid alkenes, liquid aromatics, such as benzene, toluene and/or xylene, liquid cycloaliphatic hydrocarbons, such as cyclohexane, and mixtures thereof. Exemplary hydrocarbon compositions are mixtures of $C_6$ to $C_{18}$ aliphatic hydrocarbons, kerosene, light virgin naphtha, heavy virgin naphtha, 12 pound virgin naphthas, light catalytically cracked naphtha, heavy catalytically cracked naphtha, 12 pound catalytically cracked naphtha, naphthenes, jet fuels, and the like.

The catalyst which is prepared from the method described above results in an unexpected improvement over the catalysts taught by the prior art. More specifically, the catalyst prepared by the method of this invention results in superior performance as compared to the catalyst taught in U.S. 3,378,484 in heated systems above 140 C.

The following examples illustrate specific embodiments of the invention:

EXAMPLE 1

A 3 liter ion exchange column was charged with 2 liters of a synthetic amorphous zeolite. The zeolite was sold under the trade name Aridzone AAA and has a formula $Na_2O:Al_2O_3:6SiO_2:XH_2O$. The zeolite was backwashed with 6 liters of deionized water. A 2% solution of $CuSO_4 \cdot 5H_2O$ in deionized water was prepared. The solution was passed through the column containing the zeolite at a rate of 134 milliliters per minute (equivalent to 0.5 gallon per minute per cubic foot). Afterwards the zeolite was rinsed free of $CuSO_4$ solution with deionized water and drained. The resulting material was oven dried at 100° C. for 6 hours. The material contained 1.3 milliequivalents of copper per cubic centimeter of catalyst. The copper exchanged zeolite was heated from room temperature to 500° C. over a period of 6 hours, the holding at 500° C. in an air atmosphere for 12 hours. The material was allowed to cool to room temperature slowly over a period of 6 hours by reducing the furnace temperature.

EXAMPLE 2

A metal exchanged aluminosilicate was prepared according to the teachings of U.S. 3,378,484. The procedure for its preparation was the same as in Example 1 with the exception that at the end of the drying step at 110° C. for 6 hours, no further treatment was made.

EXAMPLE 3

Five hundred (500) ml. of settled volume of a synthetic amorphous zeolite was rinsed with deionized water in a beaker to remove fines and to reduce the pH of the composition to 9.0. The material was placed in a 5 liter plastic funnel fitted with a sintered glass disc at the narrow end. The function of the glass disc was to admit air or water. The disc also served as a drain means. A quantity of 94 grams of $CuSO_4 \cdot 5H_2O$ (equivalent to 1.5 meq. of $Cu^{+2}$ per ml. of zeolite) was dissolved in 3 liters of deionized water and mixed with the zeolite by blowing air through the glass disc for a period of 2 hours. After rinsing out the $CuSO_4$ solution with water, the water was displaced by pouring through several liters of isopropyl alcohol. Cu analysis was 0.86 meq./Cu/ml.

EXAMPLE 4

One-half of the material prepared in Example 3 was heated from room temperature to 500° C. over a period of 6 hours. The temperature was increased to 575° C. and held at that temperature for 10 hours. The material was allowed to cool to room temperature by reducing the furnace temperature over a period of 6 hours.

EXAMPLE 5

In order to evaluate the improvements of this invention, the materials prepared in Examples 1–4 were evaluated in a pilot plant reactor. The reactor was charged with 75 cc. of the material to be tested. The feedstock was a mixed hydrocarbon blend having a boiling point range from 265° F. to 455° F. The feedstock contained 88 p.p.m. organic mercaptan. The reactor conditions were:

Reaction temperature _____ 170° F.
Feed throughput (LHSV) ____ 3.0.
Air feed _____ 1.0 s.c.f./bbl. feedstock.
Reactor pressure _____ 50 p.s.i.g.

The reactor was run for 28 days. The product feedstock was tested for copper throughout this period. The results are listed in Table I.

TABLE I

| Days | Copper in product (p.p.m.) | | | |
|---|---|---|---|---|
| | Ex. 1 | Ex. 2 | Ex. 3 | Ex. 4 |
| 1 | <0.01 | <0.01 | <0.01 | <0.01 |
| 2 | <0.01 | <0.01 | <0.01 | <0.01 |
| 3 | <0.01 | 0.25 | 0.20 | <0.01 |
| 4 | <0.01 | <0.01 | 0.15 | <0.01 |
| 5 | <0.01 | <0.01 | <0.01 | <0.01 |
| 6 | <0.01 | <0.01 | 0.10 | <0.01 |
| 7 | <0.01 | 0.15 | 0.15 | <0.01 |
| 8 | <0.01 | <0.01 | 0.20 | <0.01 |
| 9 | <0.01 | 0.20 | 0.20 | <0.01 |
| 10 | <0.01 | <0.01 | 0.15 | <0.01 |
| 11 | <0.01 | <0.01 | 0.20 | <0.01 |
| 12 | <0.01 | 0.10 | 0.15 | <0.01 |
| 13 | <0.01 | 0.20 | 0.20 | <0.01 |
| 14 | <0.01 | 0.50 | 0.50 | <0.01 |
| 15 | <0.01 | 0.25 | 0.25 | <0.01 |
| 16 | <0.01 | 0.20 | 0.30 | <0.01 |
| 17 | <0.01 | 0.20 | 0.20 | <0.01 |
| 18 | <0.01 | 0.25 | 0.30 | <0.01 |
| 19 | <0.01 | <0.01 | 0.25 | <0.01 |
| 20 | <0.01 | 3.0 | 0.50 | <0.01 |
| 21 | <0.01 | 0.25 | 0.90 | <0.01 |
| 22 | <0.01 | <0.01 | 0.85 | <0.01 |
| 23 | <0.01 | 4.0 | 0.75 | <0.01 |
| 24 | <0.01 | 0.50 | 3.0 | <0.01 |
| 25 | <0.01 | 0.25 | 2.50 | <0.01 |
| 26 | <0.01 | 0.50 | 1.75 | <0.01 |
| 27 | <0.01 | 0.25 | 2.0 | <0.01 |
| 28 | <0.01 | 0.25 | 2.50 | <0.01 |

EXAMPLE 6

An additional evaluation was performed on the materials using a kersosene feedstock derived from a West Texas crude oil. The boiling point range of this feedstock was from 312 to 510° F. The feedstock contained 260 p.p.m. of organic mercaptan. The following conditions were maintained on the reactor:

Reaction temperature _____ 180° F.
Feed throughput (LHSV) _____ 3.0.
Air feed _____ 3.5 s.c.f./bbl. feedstock.
Reactor pressure _____ 50 p.s.i.g.

The evaluation was performed over a 15 days period. Samples were taken to determine the copper loss. The analyses are listed in Table II.

TABLE II

| Days | Copper in product (p.p.m.) | | | |
|---|---|---|---|---|
| | Ex. 1 | Ex. 2 | Ex. 3 | Ex. 4 |
| 1 | <0.01 | <0.01 | <0.01 | <0.01 |
| 2 | <0.01 | <0.01 | <0.01 | <0.01 |
| 3 | <0.01 | <0.01 | <0.01 | <0.01 |
| 4 | <0.01 | <0.01 | 0.15 | <0.01 |
| 5 | <0.01 | <0.01 | 0.10 | <0.01 |
| 6 | <0.01 | 1.75 | 0.50 | <0.01 |
| 7 | <0.01 | 0.95 | 0.75 | <0.01 |
| 8 | <0.01 | 1.0 | 9.95 | <0.01 |
| 9 | <0.01 | 1.25 | 1.0 | <0.01 |
| 10 | 0.20 | 1.50 | 1.50 | <0.01 |
| 11 | 0.25 | 1.50 | 1.45 | <0.01 |
| 12 | <0.01 | 1.0 | 1.75 | <0.01 |
| 13 | <0.01 | 1.50 | 1.50 | <0.01 |
| 14 | <0.01 | 2.0 | 2.05 | <0.01 |
| 15 | <0.01 | 2.50 | 3.0 | <0.01 |

The results shown in Tables I and II illustrate the dramatic improvement in the retention of copper by the zeolite in the cases where the metal exchanged zeolite was calcined using the procedure of this invention.

EXAMPLE 7

In order to further evaluate the effects of calcination an additional test was performed to determine the stability of the materials. This test involved placing 5 cc. of a material in a 150 cc. bottle and 100 cc. of a sour kerosene containing 260 p.p.m. organic mercaptan. The bottle was placed in a shaking device for 90 minutes.

A kerosene sample was taken every 15 minutes and analyzed for copper. At the end of the 90 minute period the kerosene was drained and decanted off the catalyst and fresh sour kerosene was added and shaking was resumed for another 90 minutes period with samples again being taken every 15 minutes for copper analysis. This procedure was repeated 4 times and the results are shown in Table III. It can be readily seen that the calcined material of Examples 1 and 4 lost much less copper to the kerosene than the uncalcined material of Examples 2 and 3.

TABLE III

| Run number | Time into reaction (minutes) | Copper in product (p.p.m.) | | | |
|---|---|---|---|---|---|
| | | Ex. 1 | Ex. 2 | Ex. 3 | Ex. 4 |
| 1 | 0 | | | | |
| | 15 | 13.70 | 24.70 | 25.30 | 13.75 |
| | 30 | 8.08 | 12.40 | 11.60 | 8.83 |
| | 45 | 4.98 | 5.29 | 6.25 | 5.12 |
| | 60 | ±2.67 | 2.35 | 3.21 | 3.20 |
| | 75 | 1.76 | 1.29 | 1.76 | 1.70 |
| 2 | 0 | | | | |
| | 15 | 1.91 | 14.65 | 15.40 | 2.25 |
| | 30 | 1.19 | 13.51 | 12.99 | 1.42 |
| | 45 | 0.80 | 10.00 | 10.13 | 1.00 |
| | 60 | 0.41 | 6.14 | 6.82 | 0.60 |
| | 75 | 0.32 | 3.75 | 4.12 | 0.21 |
| | 90 | Nil | 2.30 | 2.50 | 0.01 |
| 3 | 0 | | | | |
| | 15 | 0.26 | 7.23 | 7.50 | 0.92 |
| | 30 | 0.16 | 7.12 | 6.93 | 0.50 |
| | 45 | 0.14 | 5.00 | 5.12 | 0.19 |
| | 60 | 0.15 | 3.17 | 3.62 | 0.19 |
| | 75 | 0.16 | 1.77 | 2.11 | 0.15 |
| | 90 | 0.12 | 0.83 | 0.99 | 0.10 |
| 4 | 0 | | | | |
| | 15 | 0.61 | 5.41 | 9.40 | 0.59 |
| | 30 | 0.41 | 8.50 | 8.94 | 0.40 |
| | 45 | 0.21 | 8.39 | 8.40 | 0.20 |
| | 60 | 0.15 | 7.11 | 7.00 | 0.16 |
| | 75 | 0.12 | 4.84 | 5.21 | 0.13 |
| | 90 | 0.08 | 2.60 | 2.99 | 0.09 |

Both chromium and tin exchanged aluminosilicate zeolites were prepared according to the procedure of Examples 1 and 2. These materials were evaluated according to the procedure described in Example 5 with results showing substantive improvements as with the copper exchanged zeolites.

EXAMPLE 8

Wet chemical treatments were performed on samples of the non-calcined copper exchanged zeolite material and the calcined copper exchanged zeolite material in order to discover any differences in chemical composition and state of the active copper of the two catalysts. These treatments were performed on 5 cc. samples of each material placed in a small ion exchange column. Each chemical (100 cc. of each) was passed through the catalyst over an hour period and the effluent then analyzed for copper extracted or eluated from the catalyst. The results of these tests are shown in Table IV.

TABLE IV

| Chemical treatment | Meq. $Cu^{+2}$/cc. material[1] of— | |
|---|---|---|
| | Calcined zeolite | Uncalcined zeolite |
| $H_2O$ | | |
| 0.1% $NaCl$-$NH_3$ solution | 0.156 | 1.210 |
| 0.1% HCl solution | 0.726 | |
| 0.1% NaOH solution | 0.436 | |
| Total | 1.318 | 1.210 |

[1] Milliequivalents of copper ion per cc. of catalyst material.

It can be seen from Table IV all of the copper was removed from the uncalcined zeolite sample by the $NaCl$-$NH_3$ treatment while only a portion was removed in the calcined sample. The treatment of the samples with HCl resulted in no copper being removed from the uncalcined zeolite since it was essentially all removed by the previous step and a large amount was removed from the calcined material. Essentially, the same result was observed in the NaOH treatment. The zeolite base is essentially destroyed by the NaOH treatment and thus any copper remaining in either catalyst material could be extracted.

The fact that the calcined material has to be completely broken down in order to remove all the copper bound to it is evidence that a strong chemical bond exists between the copper atoms and the zeolite molecule.

We claim:
1. A method for sweetening sour hydrocarbon compositions which comprises contacting a liquid hydrocarbon containing organic mercaptans of the formula RSH with a heavy metal exchanged aluminosilicate zeolite, said exchanged aluminosilicate zeolite prepared by the steps:
  (a) forming a heavy metal exchanged zeolite by contacting an aluminosilicate zeolite with a dilute solution of a heavy metal salt, wherein said heavy metal salt contains a heavy metal selected from the group consisting of copper, chromium, tin and mixtures thereof, such that the aluminosilicate zeolite contains from 5 to 20% by weight of heavy metal;
  (b) rinsing said exchanged zeolite with water;
  (c) drying said rinsed zeolite at from 80 to 150° C. for from 2 to 6 hours;
  (d) heating said dried zeolite to 500° C. over a period of 4 to 8 hours;
  (e) calcining said zeolite from step (d) at 500 to 700° C. for from 6 to 12 hours; and
  (f) cooling said calcined zeolite to ambient temperature over a period of 3 to 6 hours.
2. A method of claim 1 wherein said heavy metal salt is selected from the group consisting of copper sulfate, copper chloride, copper nitrate and copper acetate.
3. A method of claim 1 wherein the aluminosilicate zeolite is represented by the formula:

$$0.9 \pm 0.2 M_{2/n}O : Al_2O_3 : xSiO_2$$

wherein: M is selected from the group consisting of hydrogen, monovalent and divalent metal cations and mixtures thereof; $n$ is the valance of M; and $x$ is a number from about 1.5 to about 12.
4. A method of claim 1 wherein the dilute solution of said heavy metal salt consists of an aqueous solution containing from 1 to 25% by weight of a heavy metal salt.
5. A method of claim 1 wherein the drying of said rinsed zeolite in step (c) is at 110° C.
6. A method of claim 1 wherein the calcining of said zeolite in step (e) is at 500° C. for 12 hours.

References Cited
UNITED STATES PATENTS

| | | | |
|---|---|---|---|
| 3,378,484 | 4/1968 | Ferrara et al. | 208—191 |
| 3,454,488 | 7/1969 | Lewis et al. | 208—191 |

DELBERT E. GANTZ, Primary Examiner

G. J. CRASANAKIS, Assistant Examiner

U.S. Cl. X.R.

208—189; 252—455 Z